United States Patent Office 3,446,959
Patented May 27, 1969

3,446,959
METHOD OF AND APPARATUS FOR PRODUCING PARTICLES IN A METASTABLE STATE
Franklin Albert Baker, Carouge, Geneva, Switzerland, assignor to Battelle Memorial Institute, International Division, Geneva, Switzerland, an American body corporate
Filed Mar. 22, 1966, Ser. No. 536,441
Claims priority, application Switzerland, Mar. 23, 1965, 4,049/65
Int. Cl. G01n 23/12
U.S. Cl. 250—49
20 Claims

ABSTRACT OF THE DISCLOSURE

A method for producing fluid particles in a metastable state by forming through adsorption on a surface a layer of fluid and bombarding the layer with soft electrons directed to strike the layer at an angle of incidence to excite the particles thereof and release a majority of the particles in metastable state.

---

Figure 1:
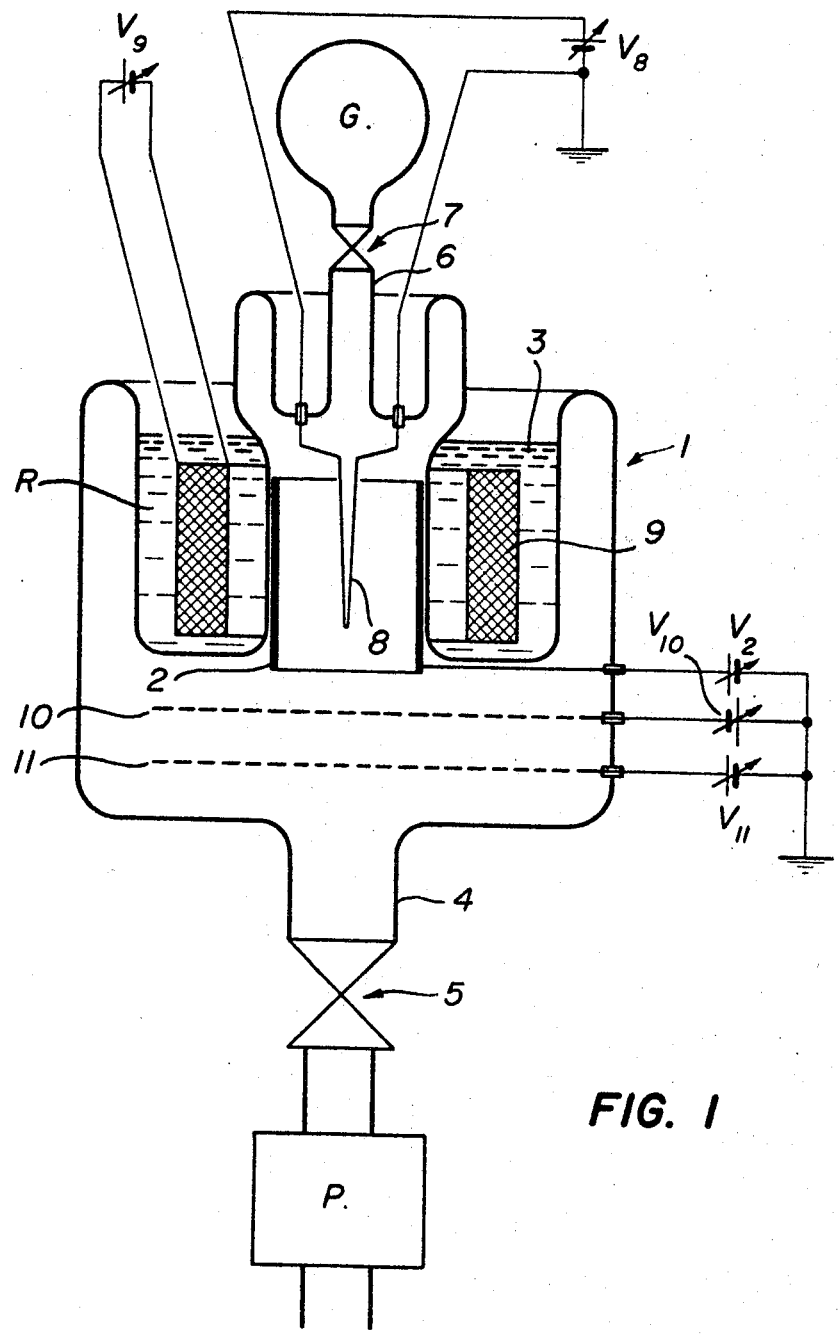

This invention relates to a method of and to apparatus for producing fluid particles in a metastable state.

The metastable states of atoms and molecules are relatively well known, such states occurring when a transition from an excited state to a state of lower energy is extremely unlikely by virtue of the rules of quantum selection.

The main interest for excited particles in a metastable state resides in the fact that an atom or molecule which is excited to such a state contains an amount of energy which is large compared to that given off by known chemical reactions, and retains this energy for a rather long period of time.

For example, a neon atom which is excited to its first metastable level $3P_2$ is 16.615 ev. above its ground level. This energy is substantially greater than that released during molecular rearrangements since, according to the well known reaction $$CH_4 + 2O_2 = CO_2 + 2H_2O + 212.7 \text{ kcal./mole}$$

the energy released during combustion of each molecule of $CH_4$ is equal to 9.2 ev. and becomes available in the form of thermal agitation energy.

Clearly a high output production of metastable atoms or molecules would make it possible to convey appreciable quantities of energy for which there are several interesting applications in various arts. Thus, metastable atoms or molecules are particularly suitable for conveying energy at a high level so that their production with an adequate efficiency would allow their use in applications in which energy is to be delivered at a given high level.

To obtain gas or vapour particles in a metastable state, two main methods have been proposed. One of these methods consists in producing an electric discharge in the gas or vapour, the other consists in irradiating this gas or vapour. The main drawback of these two methods lies in the very low output. This to a large extent is due to the dissipative collisions of the gas or vapour molecules between themselves or with the walls of the chamber in which they are produced.

An object of the present invention is to achieve an improved output in the production of metastable fluid particles.

The method according to the invention comprises forming, by adsorption on a surface, a layer of said fluid, and bombarding said layer with soft electrons directed to strike said layer at such an angle of incidence as to excite the particles thereof and release a major portion of said particles in a metastable state.

The apparatus according to the invention comprises an enclosure having gastight walls defining a chamber, an anode contiguous to the inner face of a wall of said enclosure, means for degassing the chamber and the anode, cooling means for maintaining the surface of the anode at a temperature such whereby a layer of said fluid may be formed through adsorption on a portion of said surface, vacuum pumping means outside said enclosure, a conduit connecting said chamber to said pumping means, a valve mounted on said first conduit, means for conveying said fluid into said chamber, an electron source in said chamber opposite said anode surface portion, and means for orienting the electrons emitted by said source.

Figure 2:
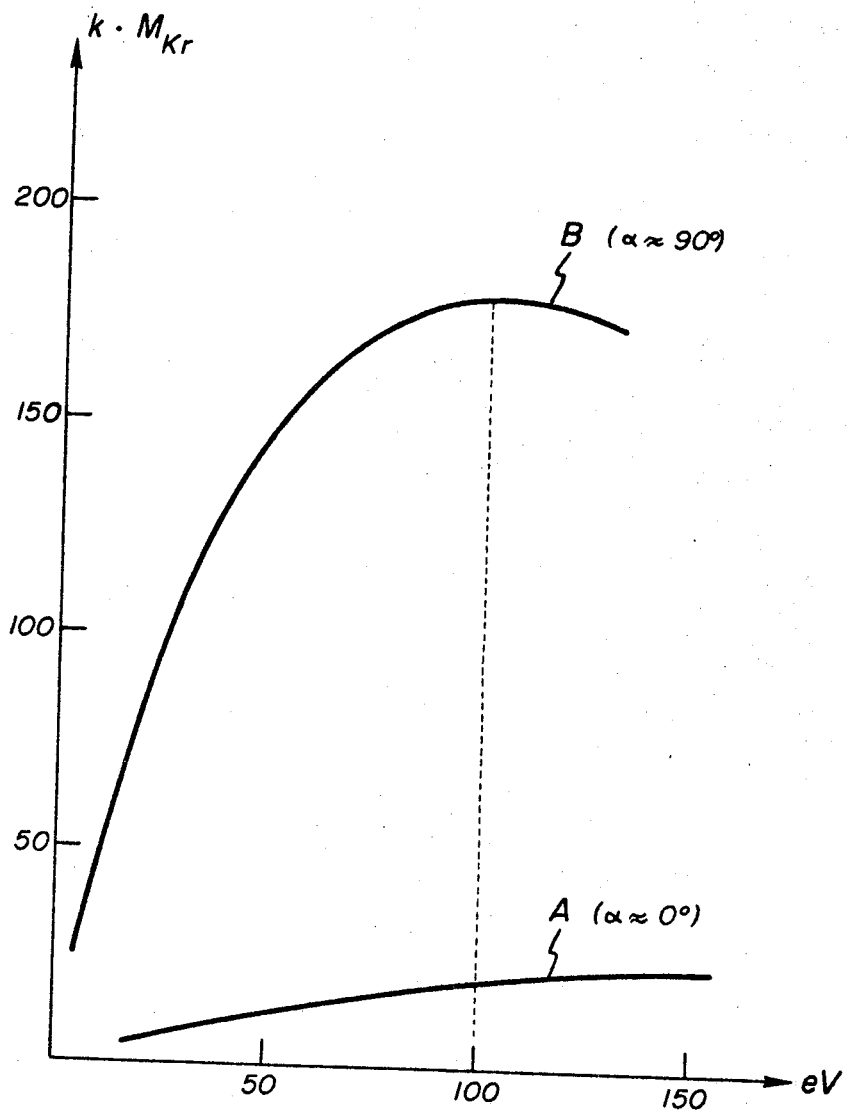

For a better understanding of the invention and to show how it may be carried into effect, the same will now be described by way of example with reference to the accompanying drawings, in which:

FIG. 1 is a diagrammatic axial section of a constructional embodiment of the apparatus according to the invention; and FIG. 2 is an explanatory graph.

The illustrated apparatus comprises an enclosure 1 having gastight walls defining a chamber in which a cylindrical anode 2 is mounted in contacting relationship with the inner face of the enclosure walls, the anode being connected to a source of variable direct voltage $V_2$.

An annular space 3 is formed outside the chamber around the anode and acts as a cooling jacket when filled with a coolant R, e.g. a suitable liquefied gas.

The chamber 1 is connected to pumping means P by a discharge duct 4 having a valve 5. An inlet duct 6, having a valve 7, connects chamber 1 to a source G of fluid whose particles are to be brought from their ground state to a metastable state.

A cathode 8, which is connected to a source of variable direct voltage $V_8$, is mounted inside the anode 2 in axial alignment so as to emit electrons towards the anode. An electro-magnet 9 is mounted in the annular space 3 coaxially around the anode 2 and is adapted to set up in conjunction with a source of variable direct voltage $V_9$ an axial magnetic field, the strength of this field being adjustable so as to impart to the electrons emitted by the cathode 8 a path such that they will strike the inner face of the anode 2 at a desired angle of incidence. A trap for charged particles is provided in chamber 1 between the anode 2 and the discharge conduit 4 and comprises two electrodes 10 and 11 of which one is connected to a source of variable negative voltage $V_{10}$ for eliminating electrons whereas the other electrode is connected to a source of variable positive voltage $V_{11}$ for eliminating positive ions.

The described apparatus operates as follows:

(a) Valve 5 is opened to bring chamber 1 into communication with the pumping means P thereby to remove all residual gas in the chamber, valve 7 being fully closed.

(b) The component parts of the apparatus are degassed through heating so that the total pressure within the system may be kept below $10^{-8}$ torr once they have cooled.

(c) The cathode 8 is earthed and heated by the voltage source $V_8$ in order that its electron emission may reach 10 ma., the potential of the anode being raised by the source $V_2$ to a value which is positive in relation to the cathode, e.g. to +100 v. when the fluid contained in the reservoir G is krypton.

(d) The electrodes 10 and 11 are energized, the first by a negative voltage and the second by a voltage which is positive in relation to that of the cathode, e.g. −10 v. and +200 v., respectively, in the case of krypton.

(e) The anode is cooled by introducing a suitable liquefied gas R into the annular space 3, e.g. liquefied nitrogen in the case of krypton, to favor adsorption of the latter.

(f) The valve 7 is partly opened so as to establish in the chamber 1 a constant pressure of about $10^{-4}$ torr, under stationary dynamic conditions, through equilibrium between the fluid entering chamber 1 past valve 7, the fluid adsorbed on anode 2 and the fluid being discharged past valve 5.

(g) The electro-magnet is energized to produce a magnetic field having a strength of about 100 gauss; this strength is accurately set to take into account in particular the potential difference between the anode and the cathode thereby to deflect the electrons into following a course of suitable curvature for the electrons to strike the anode at a desired angle of incidence, e.g. at an angle close to 90° in the case of krypton.

The operations described above bring about rapid adsorption of the fluid at the surface of the anode and the subsequent desorption, from said surface, of a mixture of metastable atoms as well as neutral and ionized atoms. The trap 10, 11 serves to eliminate all electrons and ions at the outlet of chamber 1.

The arrangement of having the cathode axially mounted inside the tubular anode provides the described apparatus with several advantages, the main such advantage being a considerable reduction in the number of dissipative collisions by the metastable particles with the chamber walls.

It should be noted that the strength of the electronic current (10 ma.) and of the anode potential (+100 v.) is not per se critical. It was found that it was possible to use electronic currents ranging from 10 $\mu$a. to 30 ma. and that potential differences of from 10 v. to 500 v. could be applied, i.e. any potential giving rise to the emission of soft or slow electrons having an energy less than 500 ev. Once this potential difference has been set, the choice of the angle of incidence will depend on the nature of the fluid and on the nature of the surface on which the fluid will be adsorbed.

Experience has shown that the angle of incidence of the electrons plays a crucial role in the method, particularly as far as output is concerned.

Thus, in the case of krypton and with a potential difference of 100 v., this angle is practically 90°, so that the highest output is achieved with a bombardment at a grazing angle of incidence. Curves A and B of FIG. 2 show, for two different angle of incidence values, i.e. an angle $\alpha$ close to 0° and an angle $\alpha$ close to 90°, the extent to which output (expressed by $k \cdot M_{Kr}$ where $k$ is a constant and $M_{Kr}$ stands for the number of metastable krypton atoms) is dependent on the energy of electrons. It will thus be observed that with krypton, maximum output is achieved with an angle close to 90° and with an energy of 100 ev.

The apparatus and conditions described above have been given by way of example only. Clearly, similar results can be obtained under different conditions and the components of the apparatus can be replaced by equivalent components. Thus, for example, the electro-magnet may be replaced by a permanent magnet in which case it is the potential difference between the anode and the cathode which has to be adjusted to obtain the desired angle of incidence. Or else, the source of electrons may be an electron gun producing an electronic beam that can be selectively orientated towards difference portions of a layer adsorbed on a surface within the enclosure.

Practice has shown that the present invention enables production in quantities of metastable fluid particles in appreciable quantities. The rare gases, inter alia argon and krypton, were treated by the invention method and produced very satisfactory yields. Clearly, the invention may be applied to any other fluid whose particles may be rendered metastable.

The building up, through adsorption, of the layer on said surface may be carried out by methods other than cooling. Thus, for example, should this surface be the surface of a semi-permeable membrane, the layer can be formed by passing the fluid through the membrane. When this surface is metallic, noble metals, e.g. gold, have certain advantages, particularly when the gases are rare gases. Transition metals can be used when a layer has to be formed with chemically active fluids.

What is claimed is:

1. A method of producing fluid particles in a metastable state, which comprises forming, by adsorption on a surface, a layer of said fluid, and bombarding said layer with soft electrons directed to strike said layer at such an angle of incidence as to excite the particles thereof and release a major portion of said particles in a metastable state.

2. A method according to claim 1, wherein the energy of said soft electrons is less than 500 ev.

3. A method according to claim 1, wherein the energy of said soft electrons is at most 100 ev.

4. A method according to claim 1, wherein the electrons are directed by a magnetic field of adjustable strength.

5. A method according to claim 1, wherein the electrons are directed by an electric field of adjustable strength.

6. A method according to claim 1 wherein the electrons are directed by a controlling field of adjustable strength and wherein said field is adjusted to obtain an angle of incidence such that the greatest portion of the released particles are in said metastable state.

7. A method according to claim 6, wherein said field is adjusted to obtain an angle of incidence close to 90°.

8. A method according to claim 1, wherein said fluid is a rare gas.

9. A method according to claim 8, wherein said rare gas is krypton.

10. A method according to claim 8, wherein said rare gas is argon.

11. A method according to claim 1, wherein said layer is formed on a metallic surface.

12. A method according to claim 1, wherein said layer is formed on a surface which is permeable to said fluid.

13. A method according to claim 12, wherein said layer is formed by passing said fluid through said permeable surface.

14. A method according to claim 1, wherein said layer is renewed during bombardment.

15. A method according to claim 1, wherein said bombarding is carried out in a vacuum at a pressure of at most 1 torr.

16. Apparatus for producing fluid particles in a metastable state, comprising an enclosure having gastight walls defining a chamber, an anode contiguous to the inner face of a wall of said enclosure, means for degassing the chamber and the anode, cooling means for maintaining the surface of the anode at a temperature such whereby a layer of said fluid may be formed through adsorption on a portion of said surface, vacuum pumping means outside said enclosure, a conduit connecting said chamber to said pumping means, a valve mounted on said conduit, means for conveying said fluid into said chamber, an electron source in said chamber opposite said anode surface portion, and means for orienting the electrons emitted by said source.

17. Apparatus according to claim 16, wherein the electron orienting means are means for producing a magnetic field of adjustable strength.

18. Apparatus according to claim 16, wherein the electron orienting means are means for producing an electric field of adjustable strength.

19. Apparatus according to claim 17, wherein said anode is tubular and said electron source is a cathode mounted co-axially inside said anode, and wherein said means for producing a magnetic field of adjustable strength include an electro-magnet co-axially surrounding said anode to produce an axial magnetic field.

20. Apparatus according claim 19, characterized in that the inner, layer-receiving, surface of the tubular anode is of noble metal.

References Cited

UNITED STATES PATENTS

| | | | |
|---|---|---|---|
| 2,992,980 | 7/1961 | Suttle | 204—193 |
| 3,325,641 | 6/1967 | Jones | 250—44 |

RALPH G. NILSON, *Primary Examiner.*

A. L. BIRCH, *Assistant Examiner.*

U.S. Cl. X.R.

204—164; 250—49.5; 313—231

Dedication 3,446,959.—*Franklin Albert Baker*, Carouge, Geneva, Switzerland. METHOD OF AND APPARATUS FOR PRODUCING PARTICLES IN A METASTABLE STATE. Patent dated May 27, 1969. Dedication filed Mar. 26, 1984, by the assignee, *Battelle Memorial Institute*.

Hereby dedicates to the People of the United States the entire remaining term of said patent.

[*Official Gazette June 12, 1984.*]